United States Patent
Ortiz et al.

(10) Patent No.: US 8,645,601 B2
(45) Date of Patent: Feb. 4, 2014

(54) METHODS AND SYSTEMS FOR PERFORMING SERIAL DATA COMMUNICATION BETWEEN A HOST DEVICE AND A CONNECTED DEVICE

(75) Inventors: Juan Ortiz, Bellevue, WA (US); Biao Jia, Lake Elsinore, CA (US)

(73) Assignee: SMSC Holdings S.A.R.L., Luxembourg (LU)

( * ) Notice: Subject to any disclaimer, the term of this patent is extended or adjusted under 35 U.S.C. 154(b) by 155 days.

(21) Appl. No.: 13/149,103

(22) Filed: May 31, 2011

(65) Prior Publication Data

US 2011/0314196 A1 Dec. 22, 2011

Related U.S. Application Data

(60) Provisional application No. 61/354,035, filed on Jun. 11, 2010.

(51) Int. Cl.
*G06F 13/42* (2006.01)
*G06F 13/38* (2006.01)

(52) U.S. Cl.
CPC .................................. *G06F 13/385* (2013.01)
USPC ............................................................ 710/106

(58) Field of Classification Search
USPC .................................. 710/104–110, 300–317
See application file for complete search history.

(56) References Cited

U.S. PATENT DOCUMENTS

| | | | |
|---|---|---|---|
| 4,931,250 A | 6/1990 | Greszczuk | |
| 5,315,706 A | 5/1994 | Thomson et al. | |
| 5,796,808 A | 8/1998 | Scott et al. | |
| 6,230,283 B1 * | 5/2001 | Gambino | 714/12 |
| 7,010,607 B1 | 3/2006 | Bunton | |
| 8,347,017 B2 * | 1/2013 | Tseng | 710/313 |
| 2006/0294272 A1 | 12/2006 | Chou et al. | |
| 2009/0327536 A1 | 12/2009 | Solomon et al. | |
| 2010/0169511 A1 * | 7/2010 | Dunstan et al. | 710/16 |

(Continued)

OTHER PUBLICATIONS

Universal Serial Bus 3.0 Specification, Revision 1.0; Nov. 12, 2008, 482 pages; Parts 1, 2, and 3.

(Continued)

*Primary Examiner* — Raymond Phan
(74) *Attorney, Agent, or Firm* — King & Spalding L.L.P.

(57) ABSTRACT

Various methods, devices, systems, and machine readable mediums are provided which may be used in accordance with a protocol, such as a protocol used to support the transfer of data and commands between a host and a device. In one embodiment, a driver on a host device may be used to implement a protocol to provide support for various features of the universal serial bus (USB) attached storage (UAS) protocol when interfacing the host device with one or more connected devices that are compatible with either the USB 2.0 standard or the USB 3.0 standard. In this regard, a single driver on the host device may be used to support USB 2.0 and USB 3.0 devices. In another embodiment, such a protocol may be used to support USB 3.0 devices without requiring USB 3.0 streaming capabilities to be supported by host devices or connected devices.

22 Claims, 3 Drawing Sheets

(56) References Cited

U.S. PATENT DOCUMENTS

| | | | |
|---|---|---|---|
| 2011/0022769 A1* | 1/2011 | Hung et al. | 710/313 |
| 2011/0113106 A1 | 5/2011 | Klein et al. | |
| 2011/0161530 A1* | 6/2011 | Pietri et al. | 710/14 |
| 2011/0179201 A1 | 7/2011 | Monks et al. | |
| 2011/0191499 A1 | 8/2011 | Andersson et al. | |
| 2011/0191503 A1* | 8/2011 | Kakish | 710/15 |
| 2011/0219163 A1* | 9/2011 | Beadnell et al. | 710/315 |
| 2011/0246681 A1 | 10/2011 | Lai | |
| 2011/0271019 A1* | 11/2011 | Ishii et al. | 710/63 |
| 2012/0059965 A1* | 3/2012 | Foster | 710/305 |
| 2012/0084485 A1* | 4/2012 | Tang et al. | 710/313 |
| 2012/0144086 A1* | 6/2012 | Lai et al. | 710/313 |

OTHER PUBLICATIONS

International Telecommunication Union—ITU-T V.22bis, Data Communication Over the Telephone Network, 1998, 18 pages.

Christopher Thomas et al., "Device Identification Using Frequency Modulated Signal Bursts," U.S. Appl. No. 12/360,984, filed Jan. 28, 2009, 28 pages.

\* cited by examiner

METHODS AND SYSTEMS FOR PERFORMING SERIAL DATA COMMUNICATION BETWEEN A HOST DEVICE AND A CONNECTED DEVICE

PRIORITY CLAIM

This application claims benefit of priority of U.S. provisional application Ser. No. 61/354,035, titled "Methods and Systems For Performing Serial Data Communication", filed Jun. 11, 2010, whose inventors are Juan Ortiz and Biao Jia and which is hereby incorporated by reference in its entirety as though fully and completely set forth herein.

FIELD OF THE INVENTION

The present invention generally relates to data communication and more particularly to serial data transfer protocols.

DESCRIPTION OF THE RELATED ART

Modem hardware systems, such as host devices, often use software in the form of device drivers to facilitate communication between the host devices and other connected devices (e.g., internal or external devices in communication with the host devices). For example, a driver may be used to permit a host device to communicate with a connected device in accordance with a particular protocol.

For well established protocols, such drivers may be provided as part of an operating system of the host device. In this regard, if a particular protocol (e.g., a communication protocol, data transfer protocol, or other types of protocols) has gained wide acceptance in the marketplace, an operating system provider may find it worthwhile to bundle a generic driver with an operating system. As a result, device providers (e.g., manufacturers, vendors, or other parties) need not provide device-specific drivers for devices that are compatible with such accepted protocols.

Unfortunately, such generic drivers are typically not provided with operating systems until a protocol has in fact become ubiquitous in the marketplace. As a result, when new protocols are introduced, device providers are often forced to provide any drivers needed to support the new protocols.

This situation is particularly problematic with regard to the current state of Universal Serial Bus (USB) technology. In this regard, the USB 2.0 standard (e.g., which as used herein is intended to include the USB 2.0 standard and all similar versions (e.g., USB 2.x)) has been widely accepted in the marketplace. As a result, generic drivers are readily available for host devices to support the USB attached storage (UAS) protocol for USB 2.0 connected devices. However, the USB 3.0 standard (e.g., which as used herein is intended to include the USB 3.0 standard and all similar versions (e.g., USB 3.x)) is relatively new and calls for various additional features, such as full duplex operation (e.g., streaming) to be supported in the UAS protocol for the USB 3.0 standard. As a result, generic drivers are currently not readily available for connected devices implemented in accordance with the USB 3.0 standard.

Moreover, the hardware and software development associated with providing streaming capabilities as set forth in the USB 3.0 standard is particularly cumbersome for device providers to implement. For example, the existing UAS protocol under the USB 3.0 standard calls for the host device and the connected device to both support streaming. However, in order to provide a device driver capable of implementing streaming, device providers typically need access to the application programming interface (API) of a controller of the host device. Unfortunately, current USB 3.0 controllers are often closed to outside developers. In addition, the implementation of drivers to support streaming in the UAS protocol of the USB 3.0 standard often requires changes to the existing USB 2.0 stack (e.g., low level, middle level, and high level drivers) used by host devices.

As a result, current providers of USB 3.0 devices are often unable to develop appropriate drivers in an efficient or economical manner.

SUMMARY OF THE INVENTION

In accordance with techniques described herein, various methods, devices, systems, and computer readable mediums are provided which may be used in accordance with a protocol, such as a protocol used to support the transfer of data and commands between a host and a device. In one embodiment, a driver on a host device may be used to implement a protocol (e.g., referred to herein as SymUAS) to provide support for various features of the UAS protocol when interfacing the host device with one or more connected devices that are compatible with either a first serial bus standard (e.g., USB 2.0 standard) or a second serial bus standard (e.g., the USB 3.0 standard). In this regard, a single driver on the host device may be used to support the first and second serial bus standards (e.g., USB 2.0 and USB 3.0) devices. In one specific embodiment, such a protocol may be used to support USB 3.0 devices without requiring USB 3.0 streaming capabilities to be supported by host devices or connected devices. While USB 2.0 and 3.0 standards are discussed below, the described embodiments may be expanded to any two standards or versions of standards.

In another embodiment, a method of implementing serial data communication between a host device and a connected device includes issuing a plurality of commands from the host device to the connected device, wherein each command includes a unique tag corresponding to a unique universal serial bus (USB) stream identifier; receiving from the connected device a first ready notification of a USB 3.0 standard, wherein the first ready notification indicates that the connected device is prepared to execute one of the commands, wherein the first ready notification does not identify the one of the commands or the tag associated with the one of the commands; receiving from the connected device a second ready notification of a USB 2.0 standard, wherein the second ready notification indicates that the connected device is prepared to execute the one of the commands, wherein the second ready notification includes the tag associated with the one of the commands to identify the one of the commands to the host device; and performing a data transfer associated with the one of the commands.

In another embodiment, a host device includes a processor; a controller; and a memory adapted to store a plurality of machine readable instructions comprising a driver which when executed by the processor adapted to cause the controller to perform a method of implementing serial data communication between the host device and a connected device, the method includes issuing a plurality of commands from the host device to the connected device, wherein each command includes a unique tag corresponding to a unique universal serial bus (USB) stream identifier, receiving from the connected device a first ready notification of a USB 3.0 standard, wherein the first ready notification indicates that the connected device is prepared to execute one of the commands, wherein the first ready notification does not identify the one of the commands or the tag associated with the one of the commands, receiving from the connected device a second ready notification of a USB 2.0 standard, wherein the second ready notification indicates that the connected device is prepared to execute the one of the commands, wherein the second ready notification includes the tag associated with the one of the commands to identify the one of the commands to the host device; and performing a data transfer associated with the one of the commands.

In another embodiment, a machine readable medium is adapted to store a plurality of machine readable instructions which when executed are adapted to cause a controller of a host device to perform a method of implementing serial data communication between the host device and a connected device, the method includes issuing a plurality of commands from the host device to the connected device, wherein each command includes a unique tag corresponding to a unique universal serial bus (USB) stream identifier; receiving from the connected device a first ready notification of a USB 3.0 standard, wherein the first ready notification indicates that the connected device is prepared to execute one of the commands, wherein the first ready notification does not identify the one of the commands or the tag associated with the one of the commands; receiving from the connected device a second ready notification of a USB 2.0 standard, wherein the second ready notification indicates that the connected device is prepared to execute the one of the commands, wherein the second ready notification includes the tag associated with the one of the commands to identify the one of the commands to the host device; and performing a data transfer associated with the one of the commands.

The claims are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

A better understanding of the present invention may be obtained when the following detailed description is considered in conjunction with the following drawings, in which.

Figure 1:
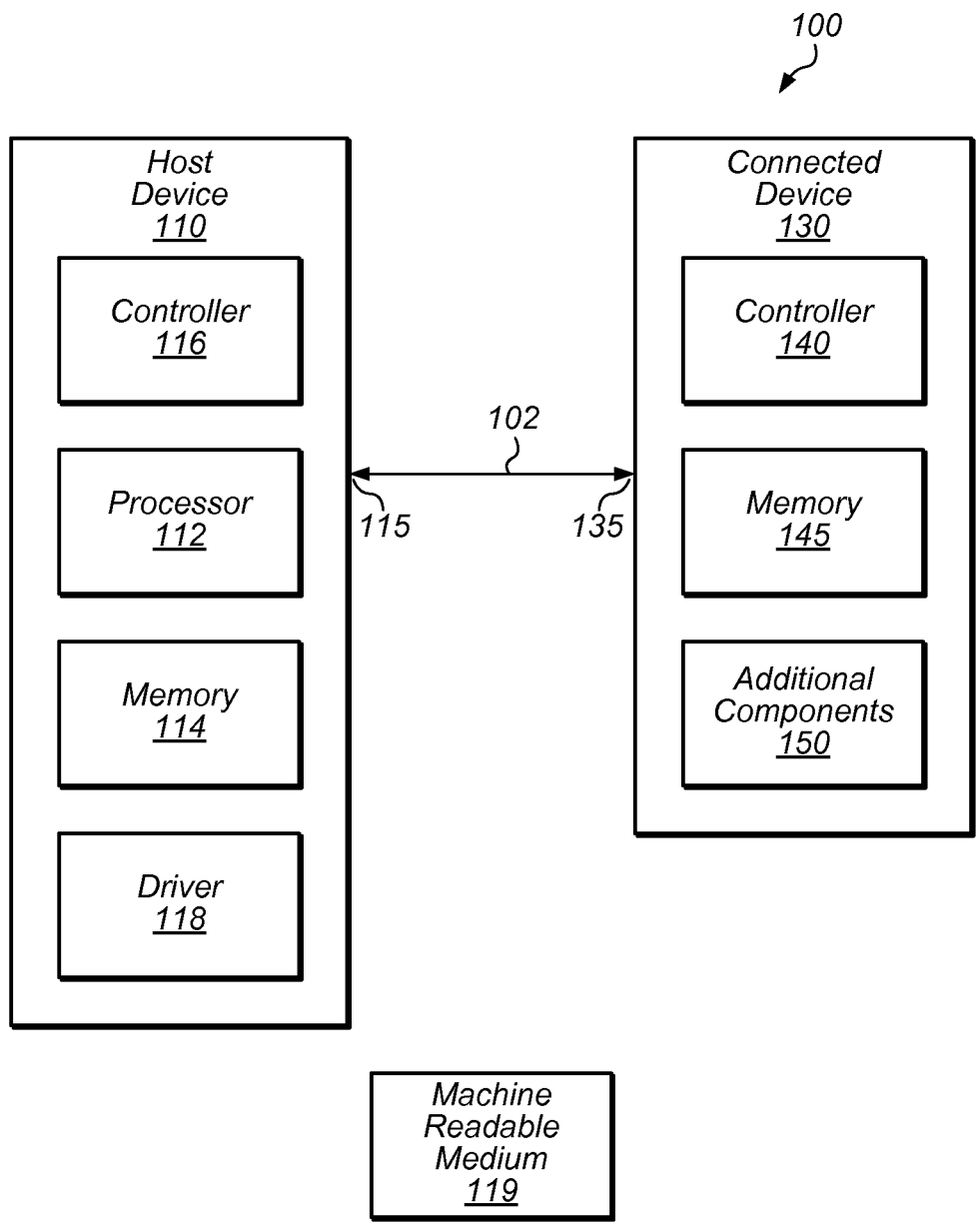
FIG. 1 illustrates a system including a host device and a connected device in accordance with an embodiment of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Exemplary Host Device and Connected Device

In accordance with embodiments disclosed herein, various techniques are provided for interfacing connected devices with host devices. For example, a driver may be provided that supports various connected devices implemented in accordance with different protocols. In one embodiment, such a driver may be used to support the UAS protocol for USB 2.0 devices and also for USB 3.0 devices. In such an embodiment, the driver may be used with existing USB 2.0 stacks on the host device without requiring the stacks to be upgraded to support streaming in accordance with the UAS protocol of the USB 3.0 standard.

FIG. 1 illustrates a system 100 including a host device 110 and a connected device 130 in accordance with an embodiment of the invention. Host device 110 may be any type of device configured to interface with connected device 130 through a bus 120. For example, in one embodiment, host device 110 may be a programmable computer system as shown in FIG. 1. In another embodiment, host device 110 may be implemented by dedicated hardware.

In the embodiment illustrated in FIG. 1, host device 110 includes a processor 112, a memory 114, a controller 116, and a driver 118. Processor 112 may be configured with appropriate software (e.g., a computer program for execution by processor 112) that is stored on a machine readable medium 119 (e.g., a CD-ROM or other appropriate medium) and/or in memory 114 to instruct processor 112 to perform one or more of the operations described herein with regard to host device 110. Similarly, one or more additional machine readable mediums 119 may also be used to instruct a processor of connected device 130. Please note that memory 114 is also a machine (or computer) readable memory medium.

Driver 118 (e.g., a software driver, also referred to as a SymUAS driver) may be included as part of the software that is stored on machine readable medium 119 and/or in memory 114 to instruct processor 112 how to interface and communicate with connected device 130 through controller 116 in accordance with various protocols.

Controller 116 may be implemented to support data communication to connected device 130 through bus 120. In various embodiments, bus 120 may be implemented to support a USB 2.0 interface, a USB 3.0 interface, a Firewire interface (e.g., an IEEE 1394 interface), and/or other appropriate interface. Accordingly, it will be appreciated that in one embodiment bus 120 may be implemented as a cable including wires for passing data communications between host device 110 and connected device 130. In another embodiment, bus 120 may include additional wires for providing bus power from host device 110 to connected device 130. Also, host device 110 and connected device 130 may include appropriate ports 115 and 135, respectively, to connect to bus 120.

Connected device 130 includes a controller 140, a memory 145, and various additional components 150. Controller 140 may be implemented to support data communication between host device 110 and additional components 150 through bus 120 in accordance with the various types of interfaces described with regard to bus 120. The connected device 130 may include any logic (e.g., integrated circuits, programmable hardware elements, such as FPGAs, processors and memory, etc.) in order to implement the embodiments described herein. For example, the controller 140 may be configured to perform the steps described in FIG. 2.

Additional components 150 may provide any types of components as may be desired in particular implementations (e.g., one or more processors, additional memories, hard drives, and/or any other type of component depending on the particular type of connected device 130 provided). Accordingly, it will be appreciated that connected device 130 may be any desired type of device such as a storage device, a hard drive enclosure, a peripheral, or any other type of device. In one embodiment, connected device 130 is an SW631x device available from Symwave, Inc. of Laguna Niguel, Calif.

Figure 2:
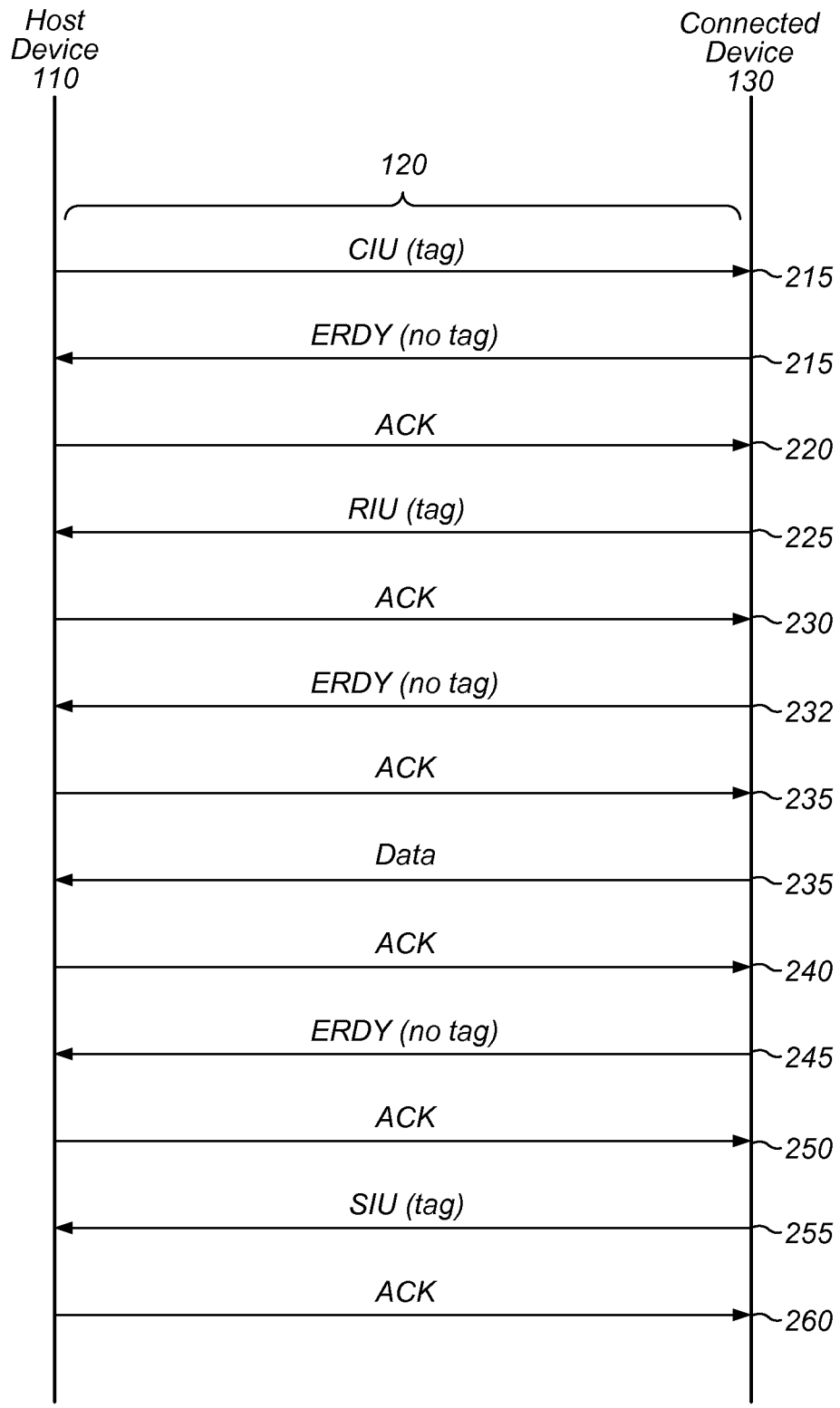
FIG. 2 illustrates various communications between a host device and a connected device in accordance with an embodiment of the invention.

FIG. 2—Exemplary Communications

FIG. 2 illustrates various communications between host device 110 and connected device 130 in accordance with an embodiment of the invention. In one embodiment, the various communications shown in FIG. 2 may be used to support data transfers between host device 110 and connected device 130 implemented as a USB 3.0 device without requiring host device 110 and connected device 130 to implement streaming in accordance with the USB 3.0 standard. In this regard, the approach set forth in FIG. 2 permits host device 110 and connected device 130 to exchange data (e.g., even if connected device 130 is a USB 3.0 device) without requiring either device to implement streaming (e.g., full duplex signaling) in accordance with the USB 3.0 standard.

In one embodiment, communications between host device 110 and connected device 130 may be provided in four phases: a command information unit phase (steps 210 to 220), a ready information unit phase (steps 225 to 230), a data phase (steps 232 to 240), and a status information unit phase (steps 245 to 260).

At step 210, host device 110 sends a command to connected device 130 in the form of a command information unit (CIU) notification with a tag that specifies a stream number (e.g., a stream identifier also referred to as a streamID). In various embodiments, the command of step 210 may be, for example, a data read command, a data write command, or any other appropriate type of command. Multiple commands may be issued from host device 110 to connected device 130, with each command having a different associated tag. In this regard, connected device 130 may respond to (e.g., reply to and/or otherwise execute) the commands out of order if desired. In this regard, the tag may be later used by connected device 130 to notify host device 110 which command is being executed.

The tag identifies a particular stream (e.g., a stream pipe) which corresponds to a data transfer (e.g., a bulk transfer) between endpoints of host device 110 and connected device 130. In this regard, It will be appreciated that, under the USB 2.0 standard, streams may be handled by software rather than hardware. As such, data transferred in accordance with the USB 2.0 standard may not include stream information. Accordingly, under the USB 2.0 standard, software may schedule only one data transfer at a time and may identify different data transfers using tags which are sent one at a time. In contrast, under the USB 3.0 standard (e.g., in the link layer), stream identification may be handled by hardware. That is, data transferred in accordance with the USB 3.0 standard may include information to distinguish between different data transfers (e.g., using streamIDs).

It will be appreciated that the USB 2.0 standard does not require the usage of endpoint ready (ERDY) notifications and therefore does not use streamIDs. Instead, under the USB 2.0 standard, tags may be embedded into CIU notifications, ready information unit (RIU) notifications, and status information unit (SIU) notifications.

Under the USB 3.0 standard, tags may be embedded into CIU notifications and SIU notifications, and streamIDs may be embedded into ERDY notifications (e.g., which may be equal to the tag values embedded in CIU and SIU notifications).

Under the SymUAS protocol, in one embodiment, tags maybe embedded in CIU notifications, RIU notifications, and SIU notifications. Moreover, under the SymUAS protocol, in such an embodiment, the streamID value embedded in ERDY notifications may be a zero value. Therefore, in such an embodiment, the SymUAS driver (e.g., software driver) may instead use the tag values embedded in CIU notifications, RIU notifications, and SIU notifications to perform software streaming.

At step 215, connected device 130 responds to the command with an ERDY notification (e.g., a type of ready notification) to indicate that connected device 130 is prepared to execute the command of step 215. For example, in the case of a data read or data write command, the ERDY notification may indicate that connected device 130 is ready to send or receive data to or from host device 110.

In one embodiment, the ERDY notification of step 215 does not include the tag previously sent by host device 110 in step 210. In this regard, it will be appreciated that the ERDY notification in this embodiment significantly differs from conventional ERDY notifications called for by the USB 3.0 standard which include the tag with the ERDY notification. Rather, in this embodiment, the tag may be included in a different communication in step 225 further described herein. As such, this different communication may be substituted for a conventional USB 3.0 ERDY notification.

At step 220, host device 110 sends an acknowledgement (ACK) notification to acknowledge receipt of the ERDY notification sent by connected device 130.

At step 225, connected device 130 sends a notification to host device 110 to indicate that connected device 130 will next be sending the data (e.g., in the case of a data read command) requested by the command of step 210. In the case of a different command (e.g., a data write command or other command), the notification of step 225 may reference such commands as appropriate.

In one embodiment, the notification of step 225 may be sent in the form of an RIU notification (e.g., another type of ready notification) with a tag that specifies the tag of the command to be executed (e.g., in this case, the command sent in step 210). It will be appreciated that the RIU notification is a type of notification that may be used in accordance with the USB 2.0 standard, but is not used in the USB 3.0 standard. In this regard, it will be appreciated that in this embodiment connected device 130 may be configured to still provide RIU notifications, even though connected device 130 is implemented as a USB 3.0 device. In particular, connected device 130 may use the USB 2.0 compatible RIU notification of step 225 (e.g., including a tag specifying a stream number) in place of a conventional USB 3.0 ERDY notification (e.g., that would typically include the tag sent by host device 110 in step 210).

At step 230, host device 110 sends an ACK notification to acknowledge receipt of the RIU notification sent by connected device 130.

At step 232, connected device 130 sends an ERDY notification to indicate that connected device 130 is ready to perform a data transfer as part of the execution of the command of step 215. For example, in the case of a data read command, the ERDY notification may indicate that connected device 130 is ready to send data to host device 110, and in the case of a data write command, the ERDY notification may indicate that connected device 130 is ready to receive data from host device 110. In one embodiment, the ERDY notification of step 232 does not include the tag previously sent by host device 110 in step 210 as similarly described herein with regard to the ERDY notification of step 215.

At step 234, host device 110 sends an ACK notification to acknowledge receipt of the ERDY notification of step 232 sent by connected device 130.

At step 235, connected device 130 sends the data (e.g., in the case of a data read command) requested by the command of step 210. In the case of a different command (e.g., a data write command or other command), a different communication may be provided (e.g., data may be sent from host device 110 to connected device 130 for a data write command, or any other appropriate communication may be used).

At step 240, host device 110 sends an ACK notification to acknowledge receipt of the data sent by connected device 130.

At step 245, connected device 130 sends an ERDY notification to inform host device 110 that connected device 130 will next be sending status information to indicate the status of the execution of the command sent by host device 110 in step 210. In one embodiment, the ERDY notification of step 245 does not include the tag previously sent by host device 110 in step 210 as similarly described herein with regard to the ERDY notification of step 215.

At step 250, host device 110 sends an ACK notification to acknowledge receipt of the ERDY notification sent by connected device 130.

At step 255, connected device 130 sends an SIU notification to host device 110 to indicate the status of the execution of the command sent by host device 110 in step 210. In the embodiment identified in FIG. 2, the command execution has been completed as a result of the data transfer performed in step 235. Accordingly, the SIU notification of step 255 includes the streamID and indicates that the command has been completed.

SIU notifications provided in accordance with the USB 2.0 and 3.0 standards include a tag that specifies a particular streamID. For streaming performed under the USB 3.0 standard, the streamID provided in conventional USB 3.0 ERDY notifications may be processed by hardware, and the tag (e.g., provided in conventional USB 3.0 SIU notifications) may be processed by software (e.g., a UAS driver). The streamID may include the same value as the tag included in the SIU notification. Accordingly, in one embodiment, the processing of SIU notifications (e.g., also the processing of other commands and/or notifications where appropriate) under the USB 2.0 standard and/or under the SymUAS protocol may not use the streamID. Rather, in such an embodiment, software (e.g., an appropriate driver) may use the tag for software streaming and for all other processing of SIU notifications.

At step 260, host device 110 sends an ACK notification to acknowledge receipt of the SIU notification sent by connected device 130.

Figure 3:
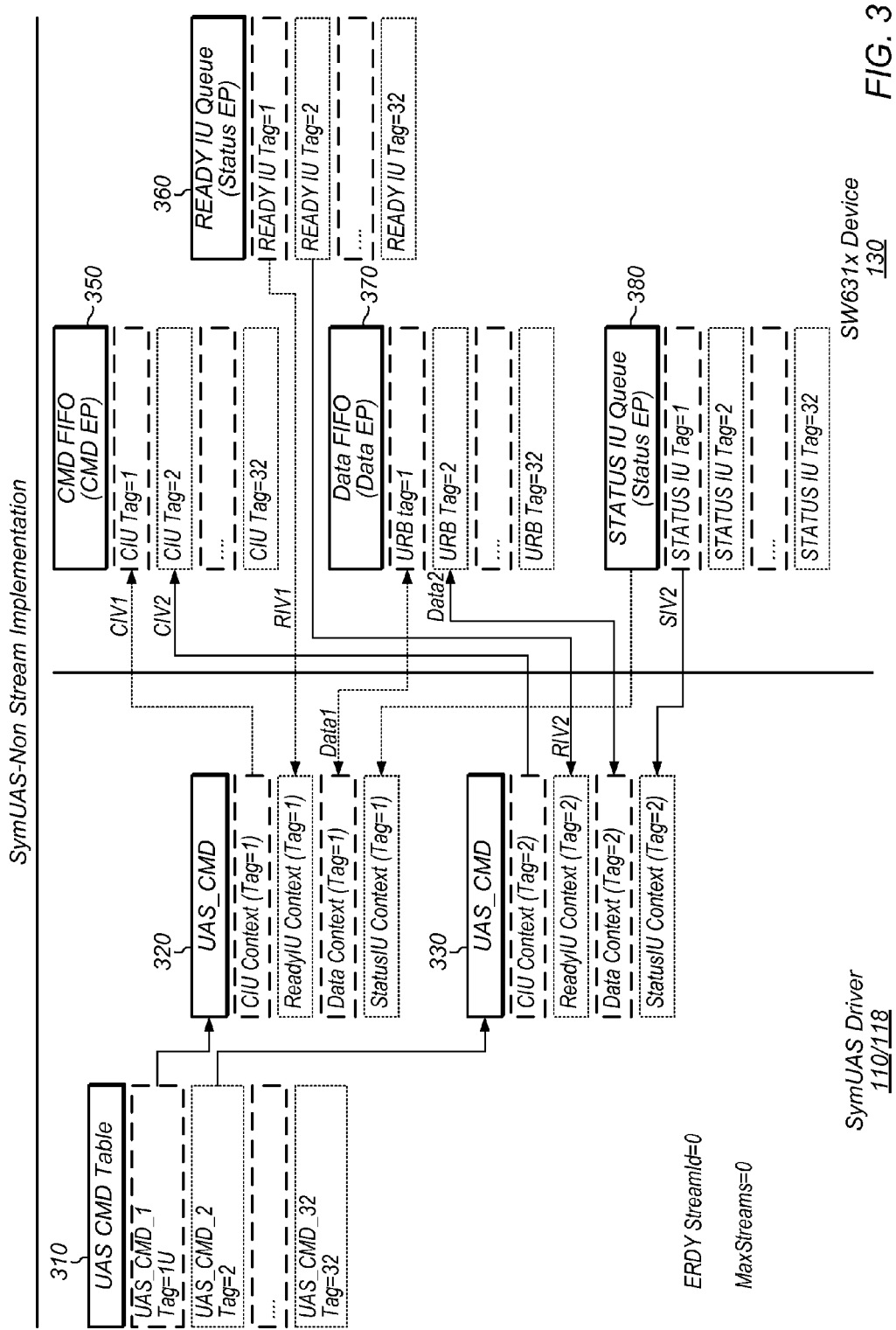
FIG. 3 illustrates additional details of various communications between a host device and a connected device in accordance with an embodiment of the invention.

FIG. 3—Additional Details for Communications Between Host and Connected Device

FIG. 3 illustrates additional details of various communications between host device 110 and connected device 130 in accordance with an embodiment of the invention. In particular, FIG. 3 illustrates various communications in relation to driver 118 running on host device 110.

As shown in FIG. 3, a command table 310 and command buffers 320 and 330 maybe provided on host device 110 (e.g., which may be maintained in memory 114 of host device 110). Command table 310 may be used to store commands issued by host device 110 along with the tags associated with the commands. As discussed, communications between host device 110 and connected device 130 may be provided in four phases: a command information unit phase (steps 210 to 220), a ready information unit phase (steps 225 to 230), a data phase (steps 232 to 240), and a status information unit phase (steps 245 to 260). In this regard, each of these four phases may be completed for each command issued by host device 110. In particular, command buffers 320 and 330 may be used to send and receive the various communications between driver 118 and connected device 130 for each phase.

As also shown in FIG. 3, a command buffer 350, a ready buffer 360, a data buffer 370, and a status buffer 380 may be provided on connected device 130 (e.g., which may be maintained in memory 145 of connected device 130). In various embodiments, each buffer 350, 360, 370, and 380 corresponds to an endpoint (e.g., EP) recognized by driver 118 in accordance with the USB 2.0 and USB 3.0 standards. Command buffer 350 may be used to store commands received from host device 110. Ready buffer 360 may be used to store RIU notifications to be provided by connected device 130. Data buffer 370 may be used to send and receive data between host device 110 and connected device 130. As shown in FIG. 3, data buffer 370 may include URB tags, each of which may correspond to a particular streamID to identify data associated with the particular command to be executed in response to an RIU notification. Status buffer 380 may be used to send SIU notifications to host device 110.

When a command is to be issued by host device 110, driver 118 builds the command and inserts the command into command table 310. As shown in FIG. 3, each command in command table 310 has an associated tag (e.g., corresponding to a streamID). In one embodiment, up to 32 different commands may be stored in command table 310.

Dashed arrows between driver 118 and connected device 130 indicate communications associated with a first command (e.g., corresponding to tag 1), and solid arrows between driver 118 and connected device 130 indicate communications associated with a second command (e.g., corresponding to tag 2) for each of the previously described four phases. In particular, various communications are shown for CIU notifications, RIU notifications, data, and SIU notifications associated with the first and second commands.

As previously discussed, connected device 130 may respond to different commands issued by host device 110 out of order if desired. Accordingly, in one embodiment, CIU notifications 1 and 2 may be sent with no intermediate delay to connected device 130 without waiting for any RIU notifications to be received back from connected device 130.

In one embodiment, connected device 130 sends RIU notifications 1 and 2 when it is ready to send or receive data associated with a corresponding command. In one embodiment, the data phase (e.g., data transfer) between host device and connected device 130 is not performed unless an RIU notification is received. In one embodiment, data communications 1 and 2 may be sent in any order (e.g., after an appropriate RIU notification has been received). For example, data 2 corresponding to CIU notification 2 may be sent before data 1 corresponding to CIU notification 1, even if CIU notification 1 issues before CIU notification 2. In one embodiment, an SIU notification is sent by connected device 130 for each completed data transfer. In one embodiment, such SIU notifications are not required to be sent immediately after the data transfer (e.g., other intervening information unit notifications may be processed, such as CIU notifications, RIU notifications, or data associated with another command).

Appendix

Additional aspects of various embodiments of the invention are further described in the attached appendix. In particular, an extensible host controller interface (XHCI) XHCI stream array is shown. The XHCI stream array is an array of pointers in which an index in the array contains a memory pointer to a Stream Context. Each Stream Context in turn points to several Transfer Descriptors (TD) which form a Transfer Ring. Each TD in a Transfer Ring contains pointers to the actual buffer where data is located. As a result, a single Stream Array (e.g., associated with a specific endpoint) may handle multiple data buffers through the use of transfer rings.

In one embodiment, a SymUAS driver may provide streaming through the operation of a higher level software driver, rather than through the use of a lower level host controller software driver such as a conventional XHCI. In this regard, the SymUAS driver may use arrays which point to a context, which in turn points to the data buffer directly (e.g., using three levels of structures/arrays to access the data buffer, in contrast to a conventional XHCI which may use four levels).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method of implementing serial data communication between a host device and a connected device, the method comprising:

issuing a plurality of commands from the host device to the connected device, wherein each command includes a unique tag corresponding to a unique universal serial bus (USB) stream identifier;

receiving, from the connected device, a first ready notification of a USB 3.0 standard, wherein the first ready notification indicates that the connected device is prepared to execute a first command of the plurality of commands, wherein the first ready notification does not indicate the first command or the unique tag associated with the first command;

receiving, from the connected device, a second ready notification of a USB 2.0 standard, wherein the second ready notification indicates that the connected device is prepared to execute the first command, wherein the second ready notification indicates the unique tag associated with the first command to identify the first command to the host device; and performing a data transfer associated with the one of the commands in response to the second ready notification.

2. The method of claim 1, wherein the method further comprises:
performing said receiving the first ready notification, said receiving the second ready notification, and said performing the data transfer a plurality of times for remaining ones of the plurality of commands.

3. The method of claim 1, wherein the first ready notification comprises a stream identification value, wherein the stream identification value is 0.

4. The method of claim 1, wherein the data transfer is a streaming data transfer.

5. The method of claim 2, wherein said receiving the first ready notification, said receiving the second ready notification, and said performing the data transfer for each command is not performed in a same order as issued from the host device.

6. A non-transitory, computer accessible memory medium storing program instructions for implementing serial data communication between a host device and a connected device, wherein the program instructions are executable to:
issue a plurality of commands from the host device to the connected device, wherein each command includes a unique tag corresponding to a unique serial bus stream identifier;
receive, from the connected device, a first ready notification of a first serial bus standard, wherein the first ready notification indicates that the connected device is prepared to execute a first command of the plurality of commands, wherein the first ready notification does not indicate the first command or the unique tag associated with the first command;
receive, from the connected device, a second ready notification of a second serial bus standard, wherein the second ready notification indicates that the connected device is prepared to execute the first command, wherein the second ready notification indicates the unique tag associated with the first command to identify the first command to the host device; and
perform a data transfer associated with the one of the commands in response to the second ready notification.

7. The non-transitory, computer accessible memory medium of claim 6, wherein the program instructions are further executable to:
perform said receiving the first ready notification, said receiving the second ready notification, and said performing the data transfer a plurality of times for remaining ones of the plurality of commands.

8. The non-transitory, computer accessible memory medium of claim 6, wherein the first ready notification comprises a stream identification value, wherein the stream identification value is 0.

9. The non-transitory, computer accessible memory medium of claim 6, wherein the first serial bus standard is USB 2.0 and wherein the second serial bus standard is USB 3.0, wherein the connected device is a USB 3.0 device.

10. The non-transitory, computer accessible memory medium of claim 7, wherein said receiving the first ready notification, said receiving the second ready notification, and said performing the data transfer for each command is not performed in a same order as issued from the host device.

11. A method of implementing serial data communication between a host device and a connected device, the method comprising:
receiving a plurality of commands from the host device, wherein each command includes a unique tag corresponding to a unique universal serial bus (USB) stream identifier;
providing a first ready notification of a USB 3.0 standard to the host device, wherein the first ready notification indicates that the connected device is prepared to execute a first command of the plurality of commands, wherein the first ready notification does not indicate the first command or the unique tag associated with the first command;
providing a second ready notification of a USB 2.0 standard to the host device, wherein the second ready notification indicates that the connected device is prepared to execute the first command, wherein the second ready notification indicates the unique tag associated with the first command to identify the first command to the host device; and
performing a data transfer associated with the one of the commands in response to the second ready notification.

12. The method of claim 11, further comprising:
performing said providing the first ready notification, said providing the second ready notification, and said performing the data transfer a plurality of times for remaining ones of the plurality of commands.

13. The method of claim 11, wherein the first ready notification comprises a stream identification value, wherein the stream identification value is 0.

14. The method of claim 11, wherein the connected device comprises a USB 3.0 device.

15. The method of claim 12, wherein said receiving the first ready notification, said receiving the second ready notification, and said performing the data transfer for each command is not performed in a same order as issued from the host device.

16. A device, comprising:
a controller; and
a one or more memories coupled to the controller;
wherein the controller is configured to implement serial data communication between a host device and the device, wherein the controller is configured to:
receive a plurality of commands from the host device, wherein each command includes a unique tag corresponding to a unique universal serial bus (USB) stream identifier;
store the plurality of commands in the one or more memories;
provide a first ready notification of a USB 3.0 standard to the host device, wherein the first ready notification indicates that the connected device is prepared to execute a first command of the plurality of commands, wherein the first ready notification does not indicate the first command or the unique tag associated with the first command;
provide a second ready notification of a USB 2.0 standard to the host device, wherein the second ready notification indicates that the connected device is prepared to execute the first command, wherein the second ready notification indicates the unique tag associated with the first command to identify the first command to the host device; and
perform a data transfer associated with the one of the commands using the one or more memories in response to the second ready notification.

17. The device of claim 16, wherein the controller is further configured to:
perform said receiving the first ready notification, said receiving the second ready notification, and said performing the data transfer a plurality of times for remaining ones of the plurality of commands.

18. The device of claim 16, wherein the first ready notification comprises a stream identification value, wherein the stream identification value is 0.

19. The device of claim 16, wherein the device comprises a USB 3.0 device.

20. The device of claim 17, wherein said receiving the first ready notification, said receiving the second ready notification, and said performing the data transfer for each command is not performed in a same order as issued from the host device.

21. A host device comprising:
- a processor;
- a controller; and
- a memory adapted to store a plurality of machine readable instructions comprising a driver, wherein the driver is executable by the processor to implement serial data communication between the host device and a connected device, wherein the driver is executable to:
  - issue a plurality of commands from the host device to the connected device, wherein each command includes a unique tag corresponding to a unique universal serial bus (USB) stream identifier;
  - receive, from the connected device, a first ready notification of a USB 3.0 standard, wherein the first ready notification indicates that the connected device is prepared to execute a first command of the plurality of commands, wherein the first ready notification does not indicate the first command or the unique tag associated with the first command;
  - receive, from the connected device, a second ready notification of a USB 2.0 standard, wherein the second ready notification indicates that the connected device is prepared to execute the first command, wherein the second ready notification indicates the unique tag associated with the first command to identify the first command to the host device; and
  - perform a data transfer associated with the one of the commands in response to the second ready notification.

22. A method of implementing serial data communication between a host device and a connected device, the method comprising:
- issuing a plurality of commands from the host device to the connected device, wherein each command includes a unique tag corresponding to a unique serial bus stream identifier;
- receiving, from the connected device, a first ready notification of a first serial bus standard, wherein the first ready notification indicates that the connected device is prepared to execute a first command of the plurality of commands, wherein the first ready notification does not indicate the first command or the unique tag associated with the first command;
- receiving, from the connected device, a second ready notification of a second USB standard, wherein the second ready notification indicates that the connected device is prepared to execute the first command, wherein the second ready notification indicates the unique tag associated with the first command to identify the first command to the host device; and
- performing a data transfer associated with the one of the commands in response to the second ready notification.

* * * * *